United States Patent [19]
Brief

[11] Patent Number: 5,903,777
[45] Date of Patent: May 11, 1999

[54] INCREASING THE AVAILABILITY OF THE UNIVERSAL SERIAL BUS INTERCONNECTS

[75] Inventor: David Brief, Ra'anana, Israel

[73] Assignee: National Semiconductor Corp., Santa Clara, Calif.

[21] Appl. No.: 08/942,774

[22] Filed: Oct. 2, 1997

[51] Int. Cl.[6] .................................................. G06F 13/00
[52] U.S. Cl. ........................ 395/880; 395/883; 375/211
[58] Field of Search .................... 395/825–839, 395/849–854, 287, 290, 728; 375/211; 370/235

[56] References Cited

U.S. PATENT DOCUMENTS

| | | | |
|---|---|---|---|
| 5,566,203 | 10/1996 | Brief et al. ............................. | 375/211 |
| 5,675,813 | 10/1997 | Holmdahl ............................... | 395/750 |
| 5,742,587 | 4/1998 | Zoring et al. .......................... | 370/235 |
| 5,784,581 | 7/1998 | Hannah .................................. | 395/290 |
| 5,799,196 | 8/1998 | Flannery ............................... | 395/750.03 |
| 5,819,051 | 10/1998 | Murray et al. ......................... | 395/287 |

OTHER PUBLICATIONS

Compaq Computer Corporation, Digital Equipment Corporation, IBM PC Company, Intel Corporation, Microsoft Corporation, NEC, Northern Telecom, *Proposal for Universal Serial Bus Specification*, rev. 1.0, (Jan. 15, 1996).

*Primary Examiner*—Christopher B. Shin
*Attorney, Agent, or Firm*—Limbach & Limbach L.L.P.

[57] ABSTRACT

A Universal Serial Bus hub circuit includes an upstream port and a plurality of downstream ports. The hub circuit further includes input circuitry via which data received on one of the downstream ports is to be repeated to the upstream port. Asynchronous event detection circuitry is to detect an asynchronous event in the received data for the one downstream port. Port selection circuitry to select the one downstream port. Timer circuitry is to measure a time period from a time that the asynchronous event detection circuitry detects an asynchronous event. Synchronous event detection circuitry is to detect a synchronous event in the received data for the one port. End-of-event generation circuitry generates a simulated end-of-event signal if the detected synchronous event is not before the end of the measured time period, and provides the simulated end-of-event signal to the upstream port.

11 Claims, 3 Drawing Sheets

1

INCREASING THE AVAILABILITY OF THE UNIVERSAL SERIAL BUS INTERCONNECTS

TECHNICAL FIELD

This application relates to Universal Serial Bus interconnects and, in particular, to such interconnect circuitry that increases the availability of the interconnect more quickly by automatically freeing up the interconnect after a noise event.

BACKGROUND

Universal Serial Bus is a standard peripheral interface for attaching personal computers to a wide variety of devices: e.g. digital telephone lines, monitors, modems, mice, printers, scanners, game controllers, keyboards and other peripherals. USB thus replaces existing interfaces such as the RS-232C serial ports, parallel ports, PS/2 interface and game/MIDI ports.

In accordance with USB, all attached devices connect to a personal computer through a single connector type using a tiered-star topology. A host controller of the USB interfaces with the host processor inside the personal computer. A USB system has only one host controller, which controls all accesses to USB resources and monitors the bus's topology. A USB hub provides USB attachment points for USB devices. A USB hub is shown in FIG. 1. The host controller includes a root hub, but a USB system can include other hubs that provide easy plug-in points for peripheral devices.

In particular, the USB hub is responsible for transferring data both upstream and downstream. All data transfers occur between the host (i.e., the personal computer) and the individual peripheral devices. The host is always at the root of the tree, and the devices are on leaves of the tree. A hub resides at each intersection. As shown in FIG. 2A, when the host transfers data to a device, data is transferred downstream through all hubs, from an upstream port (shown as Port 0 in FIG. 2A) to all non-disabled downstream ports (shown as Port 1 in FIG. 1) to all other hubs and devices. On the other hand, as shown in FIG. 2B, when data is transferred from a device to the host, the transfer occurs upstream only on the direct path to the host. A device is only allowed to transmit data only upon receipt of a special data packet, called a token. Devices may also be implemented to include hub functionality.

During a data transfer (from either the upstream port or a downstream port), the hub locks out all other data transmissions on any other port of the hub. Furthermore, conventionally, the hub has no inherent token detection capability. Thus, the hub essentially trusts that a packet received is valid, and the packet is directed upstream if detected on a downstream port, or downstream if detected on the upstream port. The detection of a packet by the hub must occur very quickly so that the hub can determine the data direction. According to the USB standard, data must be repeated by a hub from an input port to an output port in less than 40 ns. Thus, direction detection of a packet must occur as soon as possible upon detection of the first non-idle symbol of the packet. Only after the transfer direction is determined can the data packet be interrogated for validity. If the data packet is valid, the packet is transferred until an End-of-Packet symbol is detected, at which time the connection is torn down and detection of the next data packet is anticipated.

But, because the hub has no inherent token detection capabilities, a noise event occurring on one of the downstream ports cannot be distinguished from the beginning of a bona fide upstream data transfer, and any subsequent upstream data transfer from the downstream port will be blocked by the hub in response to the noise event. In addition, upstream data transfers on all upstream hubs will also be blocked. This "block" condition will persist until the end of the current (1 ms) frame period, at which time the currently selected port will be disabled, and transfers to and from any device in the downstream branch of this hub port will be disabled until management software intervenes to re-enables the entire connection.

SUMMARY

A Universal Serial Bus hub circuit includes an upstream port and a plurality of downstream ports. The hub circuit further includes input circuitry via which data received on one of the downstream ports is to be repeated to the upstream port.

Asynchronous event detection circuitry is to detect an asynchronous event in the received data for the one downstream port. Port selection circuitry to select the one downstream port.

Timer circuitry is to measure a time period from a time that the asynchronous event detection circuitry detects an asynchronous event. Synchronous event detection circuitry is to detect a synchronous event in the received data for the one port. End-of-event generation circuitry to generate a simulated end-of-event signal if the detected synchronous event is not before the end of the measured time period, and to provide the simulated end-of-event signal to the upstream port.

DETAILED DESCRIPTION

Figure 2B:
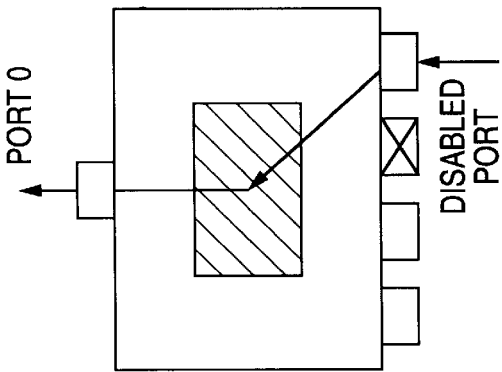
FIG. 2B illustrates a device transferring data to a host.
Figure 2A:
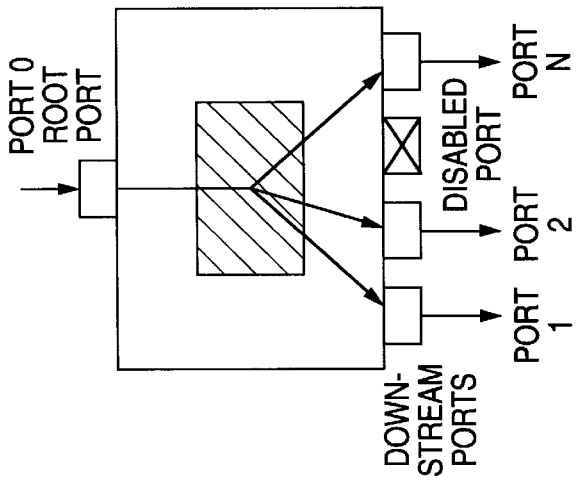
FIG. 2A illusuates a host transferring data from a host to a device.
Figure 1:
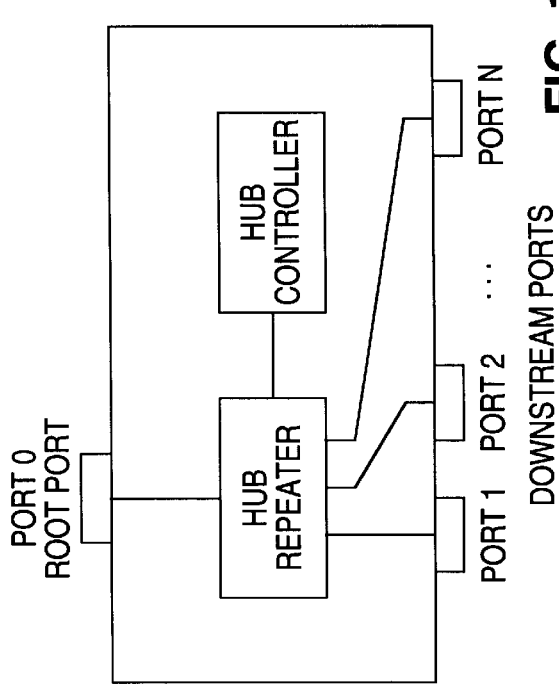
FIG. 1 illustrates a USB hub.
Figure 3:
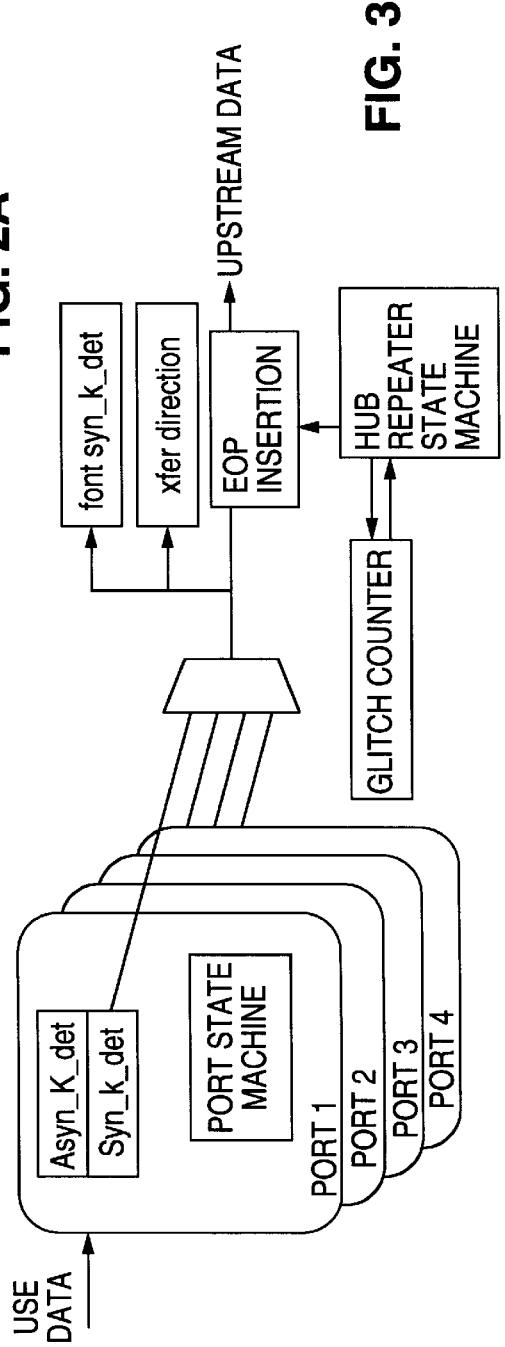
FIG. 3 illustrates an improved USB system.

FIG. 3 shows, in block form, an improved USB system whereby noise events will not cause significant "block" conditions. The improved system shown in FIG. 3 is now discussed in detail with reference to the timing diagrams shown in FIGS. 4 and 5. The FIG. 4 timing diagram illustrates how the FIG. 3 system reacts to a normal Universal Serial transfer. FIG. 5, by contrast, illustrates how the FIG. 3 system reacts to an asynchronous noise event.

Figure 4:
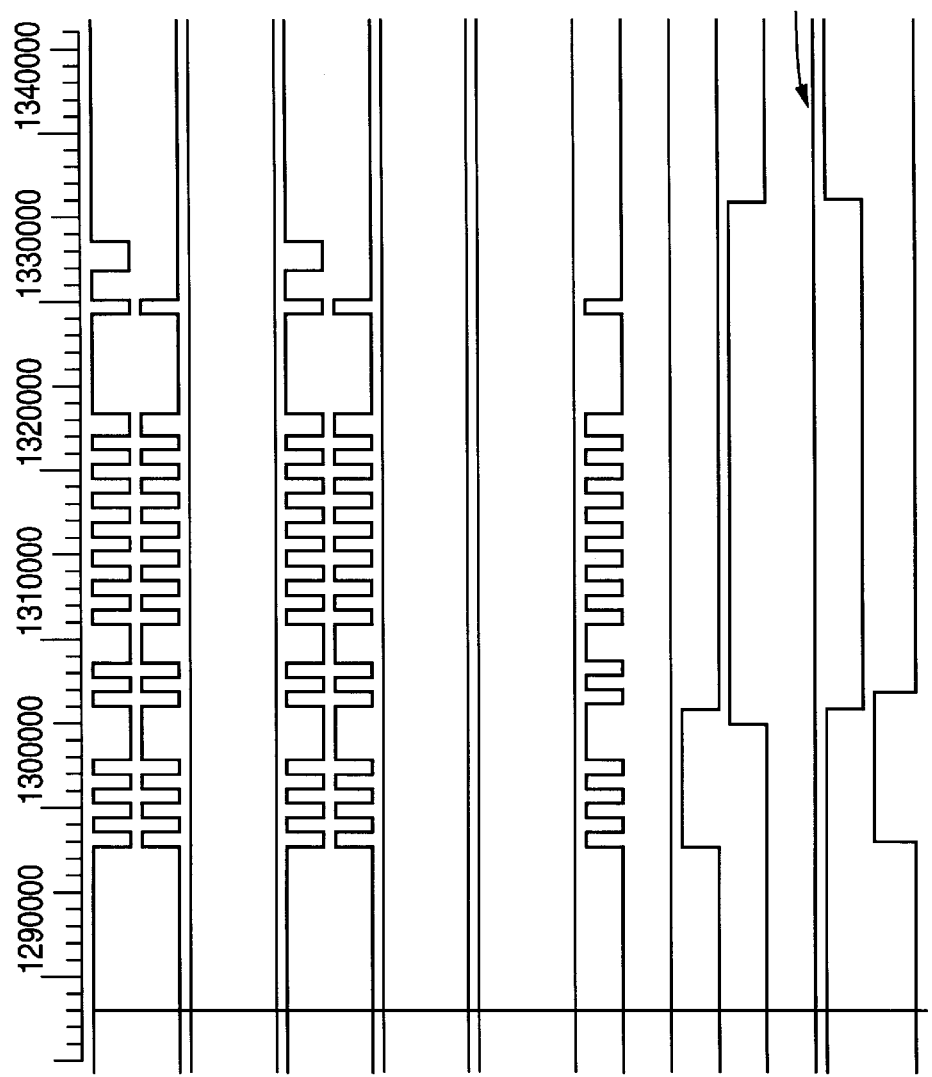
FIGS. 4A to 4J illustrates the timing of a normal (non-noise) USB transfer on the FIG. 3 system.
Figure 5:
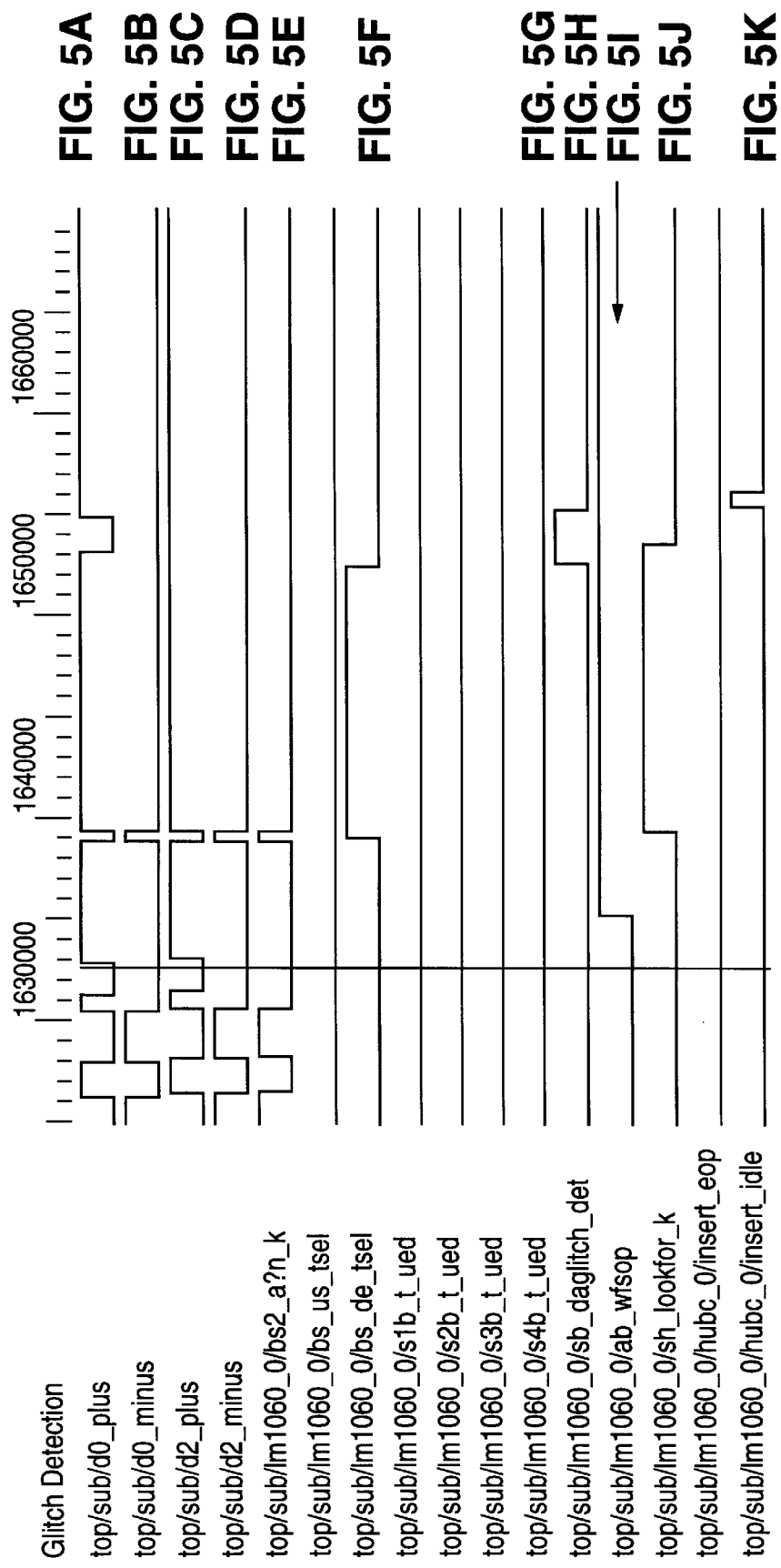
FIGS. 5A to 5K illustrate the timing of signals within the FIG. 3 system when there is a noise event in the data signal.

Referring now to FIG. 4, the d0_plus and d0_minus traces (FIGS. 4A and 4B, respectively) represent data on the upstream port of a USB hub. A packet is sent upstream from downstream port 2—the data on downstream port 2 is represented by the d2_plus and d2_minus traces (FIGS. 4C and 4D, respectively). As the packet is first detected by the asynchronous detector for port 2 (denoted as "Asyn_K_det" in FIG. 3), the bs2_asn_k signal (FIG. 4E) is asserted by a decoder in the port. The ds_tsel signal (FIG. 4F is asserted by the port state machine to indicate that a provisional direction selection has been made. Meanwhile, the glitch counter asserts the lookfor$_{13}$ k signal (FIG. 4J), which is a timer signal. When the synchronous detector on the port is selected, the t_usd signal (FIG. 4G) is asserted and the WASP signal (FIG. 4I) is deasserted, indicating that the hub repeater state machine is no longer in a state of waiting for a pulse. In addition, the provisional selection signal ds_sel is deasserted. Meanwhile, the glitch_det signal (FIG. 4H remains deasserted because the synchronous K signal was received (as indicated by the t_usd signal being asserted) before the glitch counter timed out.

The operation of the glitch counter is discussed in more detail immediately below with reference to a situation where the asynchronous K signal received (FIGS. 5C and 5D) is in response to a glitch. Specifically, the FIG. 5 timing diagram (FIGS. 5C and 5D) illustrates a situation where an asynchronous event that occurs on Port 2 is a glitch, and not the start of a data packet. The glitch causes the asynchronous detector on port 2 to assert the detection signal, bs2_asn_k (FIG. 5E), which in turn causes the bs_ds_tsel signal FIG. 5F) to be asserted, indicating that the transfer direction is set to "lupstream". At this point, the counter begins to count down a predetermined time (e.g., 16 cycles of the 48 MHz sampling clock). The sh.lookfor_k signal (FIG. 5J) is asserted while the glitch counter is counting down. That is, the sh.lookfor_k signal being asserted indicates that it is expected to detect a synchronous K. As discussed above with reference to FIG. 4, if a synchronous_K is detected before the predetermined time expires, then the glitch counter is reset and the data packet is processed normally. Otherwise, if the predetermined time expires before a synchronous_K is detected, then a single-ended zero (SEO) is inserted, by the EOP inserter, on d0_plus and dO_minus (FIGS. 5A and 5B), followed by an "idle" (FIG. 5K), to simulate an end-of-packet (EOP). This allows any upstream hub to remove its selection of this port should the glitch have propagated upstream.

Thus, a hub controller as shown in FIG. 3 need not rely on the intervention of management software to re-enable the connection that would otherwise be tied up as the result of a noise event, thereby increasing the availability of devices in a USB interconnect.

What is claimed is:

1. A Universal Serial Bus hub circuit, comprising:

an upstream port and a plurality of downstream ports;

input circuitry via which data received on one of the downstream ports is to be repeated to the upstream port;

asynchronous event detection circuitry to detect an asynchronous event in the received data for the one downstream port;

port selection circuitry to select the one downstream port;

timer circuitry to measure a time period from a time that the asynchronous event detection circuitry detects an asynchronous event;

synchronous event detection circuitry to detect a synchronous event in the received data for the one port;

end-of-event generation circuitry to generate a simulated end-of-event signal if the detected synchronous event is not before the end of the measured time period, and to provide the simulated end-of-event signal to the upstream port.

2. The hub circuit of claim 1, and further comprising:

hub clearing circuitry to clear the selection, wherein the hub clearing circuitry clears the selection if the synchronous event is not detected before the predetermined time period ends.

3. The hub circuit of claim 1, wherein the port selection circuitry indicates the selection by asserting a selection signal, and the timer circuitry is a counter circuit, wherein a counting operation of the counting circuit is initialized by the selection signal being asserted.

4. The hub circuit of claim 3, wherein the counter circuit is reset in response to the detection of the synchronous event.

5. The hub circuit of claim 4, wherein the end-of-event generation circuitry provides the end-of-event signal to the upstream port in response to the counter circuit reaching a predetermined count value.

6. The hub circuit of claim 3, wherein the input circuitry samples data responsive to state changes of the sampling clock; and the counter circuit counts responsive to the state changes of the sampling clock.

7. A method of performing Universal Serial Bus transfer in a Universal Serial Bus hub that comprises:

receiving data on one of a plurality of downstream ports of the USB hub to be repeated to the upstream port;

detecting an asynchronous event in the received data for the one downstream port;

selecting the one downstream port;

measuring a time period from a time that the asynchronous event is detected;

detecting a synchronous event in the received data for the one downstream port;

generating a simulated end-of-event signal if the detected synchronous event is not before the end of the measured time period and providing the simulated end-of-event signal to the upstream port.

8. The method of claim 7, and further comprising:

clearing the selection if the synchronous event is not detected before the predetermined time period ends.

9. The method of claim 7, wherein the selecting step indicates asserting a selection signal, and the timing step includes a counting step, wherein a counting operation of the counting step is initialized by the selection signal being asserted.

10. The method of claim 9, wherein the counting operation is reset in response to the detection of the synchronous event.

11. The method of claim 10, wherein the end-of-event signal is provided to the upstream port in response to the counter operation reaching a predetermined count value.

* * * * *